(12) United States Patent
Beckers (10) Patent No.: US 7,433,678 B2
(45) Date of Patent: Oct. 7, 2008

(54) METHOD AND SYSTEM FOR RAPIDLY SETTING UP A COMMUNICATION BETWEEN A DISK DRIVE AND A PLURALITY OF COMMUNICATING OBJECTS

(75) Inventor: Fabien Beckers, Paris (FR)

(73) Assignee: KAMELEON, Nanterre (FR)

( * ) Notice: Subject to any disclaimer, the term of this patent is extended or adjusted under 35 U.S.C. 154(b) by 179 days.

(21) Appl. No.: 10/564,374

(22) PCT Filed: Jul. 9, 2004

(86) PCT No.: PCT/FR2004/050324

§ 371 (c)(1),
(2), (4) Date: Oct. 6, 2006

(87) PCT Pub. No.: WO2005/008973

PCT Pub. Date: Jan. 27, 2005

(65) Prior Publication Data

US 2007/0093198 A1    Apr. 26, 2007

(30) Foreign Application Priority Data

Jul. 11, 2003    (FR)    .................................. 03 08557

(51) Int. Cl.
*H04M 1/66*    (2006.01)

(52) U.S. Cl. ...................... 455/411; 455/410; 455/41.2; 455/517; 455/466; 370/338; 375/134

(58) Field of Classification Search ................. 455/411, 455/410, 41.2, 517, 466; 370/351, 255, 338; 375/134, 137
See application file for complete search history.

(56) References Cited

U.S. PATENT DOCUMENTS 6,590,928 B1 * 7/2003 Haartsen ..................... 375/134

(Continued)

OTHER PUBLICATIONS

Jennifer Bray, et al., "Bluetooth—Connect Without Cables" 2001, Prentice Hall, Upper Saddle River, NJ USA, pp. 42-48; 84-86; 130-135.

(Continued)

*Primary Examiner*—Matthew Anderson
*Assistant Examiner*—Minh Dao
(74) *Attorney, Agent, or Firm*—Fulbright & Jaworski LLP (57) ABSTRACT

The invention concerns a method and a system for rapidly establishing a communication, particularly a Bluetooth type communication, between at least one reader and a plurality of communicating objects. Each communicating object and said reader have a communication protocol. Each communicating object has a communication address. The method comprises: the step of defining a unique communication address for all of the communicating objects; the step, for said reader, of determining whether at least one communicating object is present in the environment in which said reader is located, by sending a request to the unique communication address of all the communicating objects; the step, for each communicating object that receives said request, of revealing its presence to said reader by sending a response signal that is time-shifted relative to the response signals sent by the other communicating objects.

24 Claims, 6 Drawing Sheets

U.S. PATENT DOCUMENTS

| | | | |
|---|---|---|---|
| 7,016,336 B2* | 3/2006 | Sorensen | 370/351 |
| 7,050,945 B2* | 5/2006 | Oba et al. | 702/188 |
| 7,136,928 B2* | 11/2006 | Saito et al. | 709/230 |
| 7,139,529 B2* | 11/2006 | Rekimoto et al. | 455/41.3 |
| 7,366,901 B2* | 4/2008 | Hapamas et al. | 713/168 |
| 2002/0032748 A1 | 3/2002 | Myojo | |
| 2002/0059434 A1 | 5/2002 | Karaoguz et al. | |
| 2002/0061009 A1* | 5/2002 | Sorensen | 370/351 |
| 2003/0060222 A1* | 3/2003 | Rune | 455/517 |
| 2003/0093542 A1 | 5/2003 | Saito et al. | |
| 2003/0212824 A1* | 11/2003 | Yoshizawa et al. | 709/245 |
| 2004/0024884 A1* | 2/2004 | Rekimoto et al. | 709/228 |
| 2004/0078169 A1* | 4/2004 | Oba et al. | 702/186 |
| 2004/0248569 A1* | 12/2004 | Kondou et al. | 455/426.1 |
| 2005/0048919 A1* | 3/2005 | Jeannerod | 455/41.2 |
| 2005/0164717 A1* | 7/2005 | Leping | 455/458 |
| 2006/0229014 A1* | 10/2006 | Harada et al. | 455/41.2 |
| 2007/0066338 A1* | 3/2007 | Lee et al. | 455/522 |

OTHER PUBLICATIONS

ANON: "BS-A101 Quick Start Guide" CLIPSOMM, Inc., (Apr. 4, 2002), pp. 1-13.

ANON: "Bluetooth Designer: End Products: Cordless Phones" Bluetooth Designer, 'Online!, Feb. 25, 2005, pp. 1-2.

Nicolas Rouhana et al., "BWIG: Bluetooth Web Internet Gateway," ANON, 2002, pp. 1-6.

ANON: "Design and Implementation of QOS-driven Dymic," Citeseer, Feb. 20, 2005, pp. 1-2.

* cited by examiner

FIG_1

FIG_7

METHOD AND SYSTEM FOR RAPIDLY SETTING UP A COMMUNICATION BETWEEN A DISK DRIVE AND A PLURALITY OF COMMUNICATING OBJECTS

CROSS-REFERENCE TO RELATED APPLICATIONS

This application is a §371 from PCT/FR2004/050324 filed Jul. 9, 2004, which claims priority from FR 03/08557 filed Jul. 11, 2003, each of which is herein incorporated by reference in its entirety.

1. Field of the Invention

The present invention concerns a method and a system for rapidly establishing a communication between a reader and a plurality of communicating objects.

The volume of data that users are increasingly trying to obtain, particularly when using communications networks like the Internet, is constantly growing. These data are time-consuming and difficult to obtain when they concern a product or a specific object. The invention seeks to facilitate access to these data.

2. Prior Art

There is a known communication protocol called Bluetooth that makes it possible to place objects located in the same environment in communication via wireless links and to exchange data between the objects.

Bluetooth was designed to guarantee a lack of interference between various products communicating with one another. To accomplish this, the Bluetooth protocol works by dividing the 2.45 GHz frequency band into sub-frequencies.

In order to eliminate any risk of interference during a communication, two elements agree to communicate on one of these frequencies.

The connection principle is as follows. First, there is an "inquiry" process, in order to find the Bluetooth elements present to which a device can connect, and then there is a "page" process, which makes it possible to connect to a specified element using its (unique) Bluetooth address, obtained by means of the inquiry process.

When two Bluetooth objects are located within a radius of approximately 10 meters, they seek each other by hopping from one sub-frequency to another based on an algorithm, until they find each other. At this stage, each object notices that another Bluetooth device is trying to start a communication. They then begin a new random search sequence, and this second time around, they exchange their (unique) Bluetooth address, written by the manufacturer into the processor.

Once each of the elements has exchanged its identification number, one of the Bluetooth devices can decide to establish a connection with another element by naming it with its Bluetooth address. It then initiates a request containing the identifier in question, and the device involved responds by accepting the establishment of the connection. Once the connection is established, the two devices can freely exchange information.

The technological challenge consists of making the Bluetooth protocol work with a communicating object that is not connected to any main power source, such as a rechargeable battery or a direct connection to a mains supply. In fact, as mentioned above, all of the research and development currently involving Bluetooth is focused on devices fed by a main power source, because of the high power consumption of the processor during the sending, receiving and connection phases (Ex: telephone, printer, computers, etc.). Moreover, given the complexity of the protocol, the connection process can take up to 10 s.

Given the power consumed, it is impossible, with such long connection times, to make Bluetooth run on a battery, away from a main power source, for a period of more than one day. One of the objects of the invention is to obtain a service life of at least one year. One of the objects of the invention is to considerably reduce the connection time and thereby extend the service life to one year.

Furthermore, the Bluetooth protocol is inappropriate when the objects to be placed in communication must be of small size.

The solution according to the invention described below applies to a connection between a standard Bluetooth device (the reader) and a specific Bluetooth element (the communicating object, also called the chip).

OBJECT AND SUMMARY OF THE INVENTION

More specifically, the object of the invention is to make it possible to establish a communication, particularly a Bluetooth type communication, that is faster and less power-hungry than the protocols known to date.

The invention also makes it possible to integrate microprocessors, particularly Bluetooth type microprocessors, into small-size, low-cost chips.

The chips according to the invention also make it possible to exchange information with electronic equipment using standard communication protocols, such as for example the Bluetooth protocol.

The invention concerns a method for rapidly establishing a communication, particularly a Bluetooth type communication, between at least one reader and a plurality of communicating objects, each particularly in the form of a communicating object of small dimension (comparable to the size of a one-euro coin). Each communicating object and the reader has a communication protocol. Each communicating object has a communication address. The method according to the invention comprises the following steps:

the step of defining a unique communication address for all of the communicating objects the step, for the reader, of determining whether at least one communicating object is present in the environment in which the reader is located.

To do this, the reader sends a request to the unique communication address of all the communicating objects.

The method also comprises the following steps:

the step, for each communicating object that receives the request, of revealing its presence to the reader by sending a response signal that is time-shifted relative to the response signals sent by the other communicating objects, the step, for each communicating object, of inserting into the response signal to said request a piece of information specific to the communicating object in question.

The result of the combination of technical features is to reduce the time required to determine whether at least one communicating object is present.

The reader is a completely standardized Bluetooth device that receives only software. The communicating objects, although specific, are compatible with any standard Bluetooth device as long as the software is installed.

The software installed in the reader is designed to allow the execution of the steps described above. In the case where the reader is a portable telephone, the software is integrated into it during production or is downloaded into the mobile telephone from a local source (a tag or chip) or from a website.

In a variant of embodiment of the invention, the reader is associated with a mobile telephone unit, particularly a GSM unit. Preferably according to the invention, in this variant of embodiment, the method also comprises the following steps:
- the step, for the communicating object, of detecting the GSM signals sent by the mobile telephone unit,
- the step, for the communicating object, of activating, based on the GSM signals thus detected, the sending of the response signal to the request.

It is thus possible to reduce the power consumption of the communicating object by activating the sending of the response signal only at the appropriate time.

In another variant of embodiment of the invention, the communication protocol comprises standby phases and active phases. Preferably according to the invention, in this embodiment, the method also comprises the step of adapting the duration of the standby phases to the number of requests sent by the readers.

In another variant of embodiment, the method also comprises the step of establishing a Bluetooth connection between said reader and said communicating object in question, using a piece of specific information received from said communicating object.

In the case of this embodiment, the specific information includes a piece of information required by said reader to establish a Bluetooth type connection with the communicating object.

In another variant of embodiment of the invention, the method also comprises the following steps:
- the step of giving one of the communicating objects the status of master communicating object relative to the other communicating objects, which have the status of slave communicating objects,
- the step, for the master communicating object, of collecting the communication address and/or the specific information from the slave communicating objects,
- the step, for the master communicating object, of responding to the requests sent by the reader.

As a result of this combination of technical features, the reader collects all of the information from the communicating objects.

Preferably according to the invention, in this other variant of embodiment, the method also comprises the step, for the master communicating object, of transferring to another communicating object the status of master communicating object.

Preferably according to the invention, in this other variant of embodiment, the method also comprises the following steps:
- the step, for the previous master communicating object, of communicating to the new master communicating object the information it has concerning the other communicating objects,
- the step, for the new master communicating object, of verifying the information from the previous master communicating object.

In an advantageous variant of embodiment, the method is activated by means of an application, said application allowing the method to be activated by a simple action, particularly a click, from a user of the communicating object.

The presence of a user-friendly application linked to the communicating object and allowing the method according to the invention to be activated makes the method easy to use and to implement.

The invention concerns a system for rapidly establishing a communication, particularly a Bluetooth type communication, between at least one reader and a plurality of communicating objects, particularly in the form of chips. Each communicating object and the reader have a communication protocol. Each communicating object has a communication address. All of the communicating objects have the same unique communication address. The system is such that the reader comprises first sending means for sending a request to the unique communication address of all the communicating objects. Each communicating object that receives the request comprises second sending means for sending a response signal that is time-shifted relative to the response signals sent by the other communicating objects.

The result of this combination of technical features is that each communicating object reveals its presence. Another result of this combination of technical features is that the reader can thus rapidly determine whether at least one communicating object is present in the environment in which the reader is located.

The system is also such that each communicating object comprises data processing means for inserting into the response signal to said request a piece of information specific to the communicating object in question.

In a variant of embodiment of the invention, the reader is associated with a mobile telephone unit, particularly a GSM unit. Preferably according to the invention, in this variant of embodiment, the system is such that:
- each communicating object comprises detection means for detecting the GSM signals sent by the mobile telephone unit,
- each communicating object comprises activation means for activating, based on the GSM signals thus detected, the sending by the second sending means of the response signal to the request.

It is thus possible, thanks to this combination of technical features, to reduce the power consumption of the communicating object by activating the sending of the response signal only at the appropriate time.

In another variant of embodiment of the invention, the communication protocol comprises standby phases and active phases. Preferably according to the invention, in this variant of embodiment, the system is such that the data processing means of the communicating object adapt the duration of the standby phases to the number of requests sent by the readers.

In a variant of embodiment, said reader and said communicating object also comprise connection means for establishing a Bluetooth type connection between said reader and said communicating object in question, using a piece of specific information received from said communicating object.

In another variant of embodiment, preferably according to the invention the system is such that:
- the data processing means make it possible to give one of the communicating objects the status of master communicating object relative to the other communicating objects, which have the status of slave communicating objects,
- the data processing means of the master communicating object make it possible to collect the communication address and/or the specific information from each slave communicating object,
- the data processing means of the master communicating object make it possible to respond to the requests sent by the reader.

As a result of this combination of technical features, the reader collects all of the information from the communicating objects.

Preferably according to the invention, in this other variant of embodiment, the system is also such that the data processing means make it possible to transfer to another communicating object the status of master communicating object.

Preferably according to the invention, in this other variant of embodiment, the system is also such that:
- the data processing means allow the previous master communicating object to communicate to the new master communicating object the information it has concerning the other communicating objects,
- the data processing means of the new master communicating object make it possible to verify the information from the previous master communicating object.

In an advantageous variant of embodiment, the communicating object is linked to an application module that makes it possible to trigger the establishment of the communication by a simple action, particularly a click, from a user of the communicating object.

The invention concerns a communicating object, particularly in the form of a communicating object [sic], that makes it possible to rapidly establish a Bluetooth type communication between at least one reader and the communicating object. The communicating object and the reader have a communication protocol. The communicating object has a communication address. All of the communicating objects have the same unique communication address. The reader comprises first sending means for sending a request to the unique communication address of the communicating object. The communicating object comprises:
- receiving means for receiving the request from the reader,
- second sending means for sending a response signal that is time-shifted relative to the response signals sent by the other communicating objects.

The result of this combination of technical features is that each communicating object reveals its presence. Another result of this combination of technical features is that the reader can thus rapidly determine whether at least one communicating object is present in the environment in which said reader is located. The communicating object also comprises data processing means for inserting into the response signal to the request a piece of information specific to the communicating object in question.

In a variant of embodiment, the reader is associated with a mobile telephone unit, particularly a GSM unit. Preferably according to the invention, in this variant of embodiment, the communicating object comprises:
- detection means for detecting the GSM signals sent by the mobile telephone unit,
- activation means for activating, based on the GSM signals thus detected, the sending by the second sending means of the response signal to the request.

It is thus possible, thanks to this combination of technical features, to reduce the power consumption of the communicating object by activating the sending of the response signal only at the appropriate time.

In another variant of embodiment, the communication protocol comprises standby phases and active phases. Preferably according to the invention, in this variant of embodiment the communicating object is such that the data processing means of the communicating object adapt the duration of the standby phases to the number of requests sent by the readers.

In a variant of embodiment, said communicating object comprises connection means for establishing a Bluetooth type connection between said reader and said communicating object in question, using a piece of specific information received from said communicating object.

In another variant of embodiment, preferably according to the invention the communicating object is such that:
- the data processing means make it possible to give one of the communicating objects the status of master communicating object relative to the other communicating objects, which have the status of slave communicating objects,
- the data processing means of the master communicating object make it possible to collect the communication address and/or the specific information from each slave communicating object,
- the data processing means of the master communicating object make it possible to respond to the requests sent by the reader.

As a result of this combination of technical features, the reader collects all of the information from the communicating objects.

Preferably according to the invention, in this other variant of embodiment, the communicating object is also such that the data processing means make it possible to transfer to another communicating object the status of master communicating object.

Preferably according to the invention, in the case of this other variant of embodiment, the communicating object is also such that:
- the data processing means allow the previous master communicating object to communicate to the new master communicating object the information it has concerning the other communicating objects,
- the data processing means of the new master communicating object make it possible to verify the information from the previous master communicating object.

In an advantageous variant of embodiment, said communicating object is linked to an application module that makes it possible to trigger the establishment of the communication by a simple action, particularly a click, from a user of the communicating object.

BRIEF DESCRIPTION OF THE DRAWINGS

Other characteristics and advantages of the invention will become apparent through the reading of the description of variants of embodiment of the invention given as indicative, nonlimiting examples, and of FIG. 1 represents an overall diagram of a system in accordance with an embodiment of the invention.

DETAILED DESCRIPTION OF THE EMBODIMENT

In the remainder of the description, a communicating object will be designated by the terms master object, slave object, or chip, depending on the circumstances.

The standard Bluetooth technological environment to which the present invention belongs was explained at the outset of the specification. Let's review its essential characteristics.

Bluetooth was designed to guarantee a lack of interference between various products communicating with one another. To accomplish this, the Bluetooth protocol works by dividing the 2.45 GHz frequency band into sub-frequencies.

In order to eliminate any risk of interference during a communication, two elements agree to communicate on one of these frequencies.

The connection principle is as follows. First, there is an "inquiry" process, in order to find the Bluetooth elements present to which a device can connect, and then there is a "page" process, which makes it possible to connect to a specified element using its (unique) Bluetooth address, obtained by means of the inquiry process.

In the variant of embodiment described below, it is not necessary for the master object to perform an inquiry using the standard inquiry process of the Bluetooth protocol. The method according to the invention immediately implements a call process, without first searching to see if any communicating objects are present. This makes it possible to considerably reduce the time for establishing a connection, and consequently the power consumption.

In the case of the Bluetooth protocol, the inquiry mode is by far the one that requires the most time (and power), since it has to discover the nearby communicating objects (obtain their identifiers) without knowing which ones are present. The page mode, on the other hand, is extremely fast, but it requires knowing the Bluetooth communication addresses of the objects present.

According to the invention, all of the communicating objects have the same Bluetooth communication address. It is thus possible to implement the call process without going through the mode of searching for the communicating objects present (see FIG. 2). This unique communication address is encoded by the manufacturer during production. This unique communication address cannot be used to identify a particular communicating object. Once the connection is established, the communicating object transmits its identifier. The latter is a piece of information that is specific to the communicating object, not its Bluetooth communication address, which was used to establish the connection.

When a request is initiated in page mode, the connections with each of the communicating objects present are extremely fast. The disadvantage is that two objects may respond simultaneously. The means provided for getting around this problem consists of adding a random response time delta for the communicating object (see FIG. 2). The parameters of this statistical system are the listening interval of the communication object and the open time of the listening window. In essence, the communicating object listens for a period of 20 ms with a wakeup period every 2.5 s. The probability of "waking up" two communicating objects at the same time is therefore low if the number of communicating objects present is not too high. If two communicating objects respond at the same time, the connection is reinitialized and the process is restarted.

Of course, the more the number of communicating objects increases, the more difficult it becomes to make the system work properly. Currently, the theoretical limit is between 500 and 1,000 communicating objects. In order to get around this problem, a variant of embodiment of the invention, called the community mode, is described below.

The variant of embodiment described below is particularly well suited to reducing electric power consumption when the reader is associated with a mobile telephone unit.

In essence, it is desirable for a communicating object, particularly a chip, to be able to listen for a master object while consuming as little power as possible.

A chip's power consumption is dominated by the phases of waking up and searching for a reader. In order to contribute as little as possible to limiting the number of listening phases by the chip for a reader, a method using a GSM transmission detector has been implemented.

Mobile (GSM) telephones are considerably more powerful than Bluetooth transmitters (1-2 watts as opposed to 1 mW for Bluetooth), and most of the time, they are combination devices.

The chip has a signal detector like the LTC5505 which, after having detected a GSM signal, activates the search for a system based on the Bluetooth protocol. A standard or modified Bluetooth protocol can be used to obtain the information contained in the chips.

The GSM signal detector consumes far less power during the listening phases. In fact, since the GSM signal is stronger, it requires less power to detect it. It is thus possible to benefit from a significant reduction in power consumption during the listening phases. This makes it possible to extend the service life of the batteries of the communicating objects.

The variant of embodiment described below is also particularly well suited to reducing electric power consumption when chip density is high (i.e., when a large number of communicating objects are located in the same environment) or when the communicating objects are not very mobile (i.e., when the communicating objects stay together for relatively long periods of time).

This variant of embodiment will hereinafter be designated as a community operation process.

As the description below will illustrate, the community operating mode allows communicating objects that remain in a group for sufficiently long periods to conserve their batteries.

There are two possible community operating modes: the individual mode and the community mode.

These two modes are complementary and describe the operation of the chips.

The individual mode involves a single chip that is seeking a reader or a community to join, or other chips with which to form a community.

The community mode describes the behavior of the chips once the community has been formed, both from the point of view of the master chip and from the point of view of the slave chip belonging to this community.

Forming a community of communicating objects requires that a communicating object be defined, at the start of the process, as the master communicating object, based on a pre-defined algorithm.

The master object then communicates with the individual communicating objects to ask them to join the community. It also has the role of collecting all of the identifiers of the other communicating objects and of responding to the presence of a communicating object reader in order to communicate to it the identifiers of all the communicating objects in the community of communicating objects. Thus, the reader collects all of the identifiers in a single read operation.

In order not to consume all of this chip's power, this master communicating object function is transferred in round-robin fashion. The communicating object that responded first during the collection of the identifiers in turn becomes the next master communicating object of the community, and the master communicating object goes back to being a slave communicating object. This process is reiterated continuously. The master assigns to the next communicating object the role of master object of the community and the time during which the community must remain in sleep mode prior to waking up. All of the identifiers of the community are transmitted to the new master communicating object by the previous master communicating object. The new master communicating object verifies whether the information it has received is correct by performing a scan of the other identifiers.

Prior to joining a community, the communicating object is in individual mode. During this mode, the communicating object seeks:
  to join a community,
  other communicating objects for creating a community, and/or
  a communicating object reader to which to transmit its information.

Both of these community operating modes offer the following advantages:
  a much shorter connection time for the communication between the communicating objects and the reader,
  a much longer service life of the battery,
  the ability to have a high communicating object density.

In order to further reduce the power consumed, in another variant of embodiment the chip has an adaptive wakeup means. This means that if the communicating object has not seen any communicating object reader after a substantial period of time, it will progressively lengthen the time interval between two wakeups. Likewise, if the communicating object is in an environment in which there are a lot of connections, it will shorten the time between wakeups in order to optimize the transmissions. It is thus possible to minimize power consumption, for example in the case where a communicating object is located in a warehouse at night, when no active searching is necessary.

Figure 1:
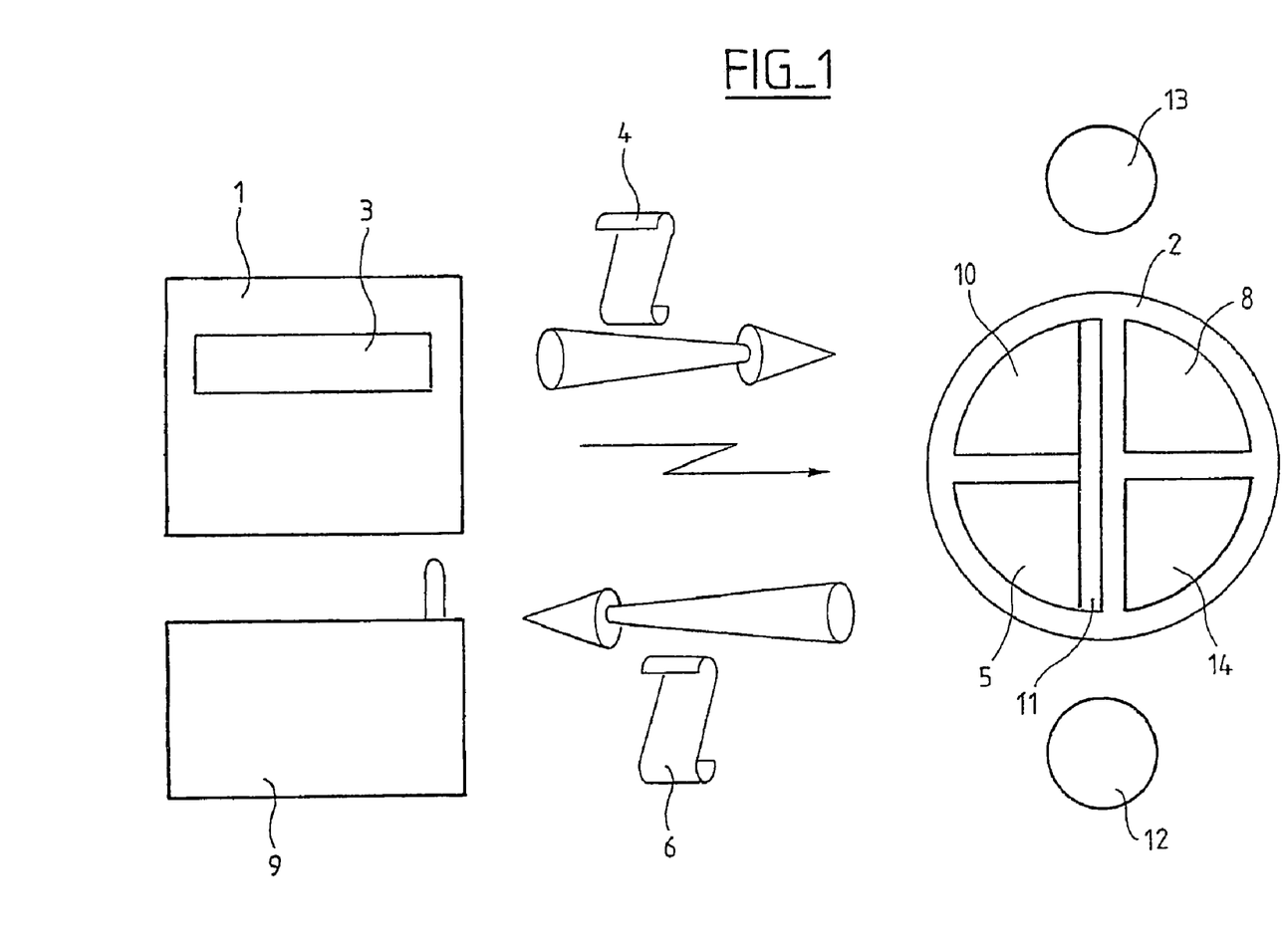

We will now describe the technical means for implementing the processes according to the invention by referring to FIG. 1, which represents an overall diagram of a system according to the invention.

The system described makes it possible to rapidly establish a communication particularly a Bluetooth type communication, between at least one reader 1 and a plurality of communicating objects 2, particularly in the form of chips. Each communicating object 2 and the reader 1 use a communication protocol. Each communicating object 2 has a communication address. All of the communicating objects 2 have the same unique communication address.

The reader 1 comprises first sending means 3 for sending a request 4 to the unique communication address of all the communicating objects 2.

Each communicating object 2 comprises receiving means 14 for receiving the request 4. Each communicating object 2 comprises second sending means 5 for sending a response signal 6 that is randomly time-shifted relative to the response signals 6 sent by the other communicating objects 2.

Thus, each communicating object 2 reveals its presence and transmits its data. The reader 1 can thus rapidly determine whether at least one communicating object 2 is present in the environment in which the reader 1 is located.

Each communicating object 2 comprises data processing means 8 for inserting into the response signal 6 to the request 4 a piece of information specific to the communicating object 2 in question.

In the variant of embodiment of the invention represented in the figure, the reader I is associated with a mobile telephone unit 9, particularly a GSM unit. In this variant, each communicating object 2 comprises:
  detection means 10 for detecting the GSM signals sent by the mobile telephone unit 9,
  activation means 11 for activating, based on the GSM signals thus detected, the sending by the second sending means 5 of the response signal 6 to the Bluetooth request 4.

It is thus possible to reduce the power consumption of the communicating object 2 by activating the sending of the response signal 6 only at the appropriate time.

The communication protocol comprises standby phases and active phases. The data processing means 8 of the communicating object 2 adapt the duration of the standby phases to the number of requests sent by said readers.

In the variant of embodiment represented in the figure, the data processing means 8 make it possible to give one of the communicating objects the status of master communicating object 12 relative to the other communicating objects 2. The latter have the status of slave communicating objects 13. Also in the variant of embodiment represented in the figure, the data processing means 8 of the master communicating object 12 make it possible to collect the communication address and/or said specific information from each slave communicating object 13. Also in the case of this variant of embodiment, said data processing means 8 of the master communicating object 12 make it possible to respond to the Bluetooth requests 4 sent by said reader 1.

Thus, the reader 1 can collect all of the information from the communicating objects.

In the variant of embodiment represented in the figure, the data processing means 8 make it possible to transfer to another communicating object the status of master communicating object 12. The data processing means 8 also allow the previous master communicating object 12 to communicate to the new master communicating object 12 the information it has concerning the other communicating objects 2. The data processing means 8 of the new master communicating object 12 make it possible to verify the information from the previous master communicating object 12.

Figure 2:
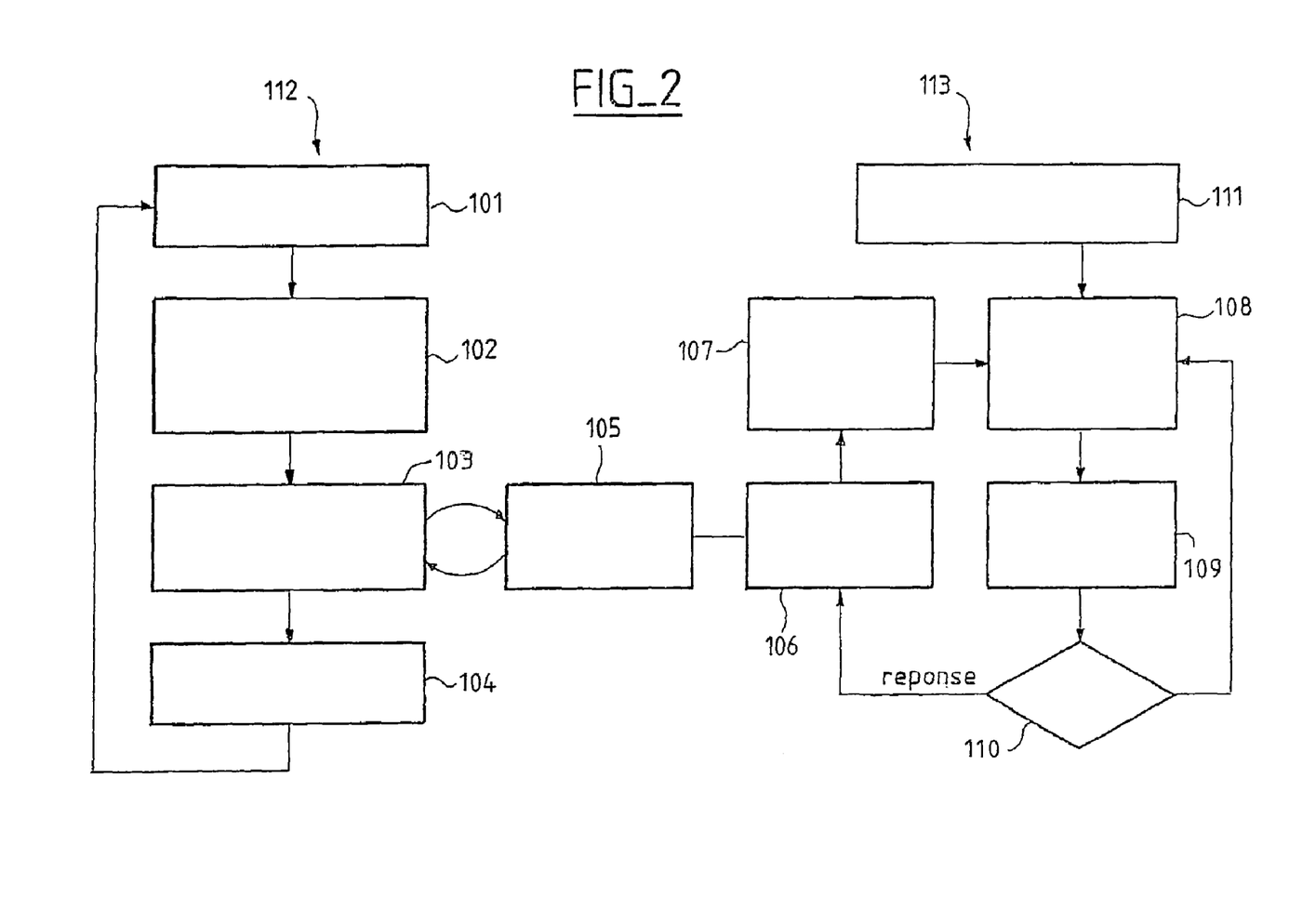
FIG. 2 represents the operational algorithm between a communicating object reader and a communicating object in accordance with an embodiment of the present invention.

We will now describe FIG. 2, which represents the operational algorithm between a communicating object reader and a communicating object.

101: Phase 101: The user initiates a search for chips.
102: Phase 102: Initialization of the system: Switch to communicating in "access mode"
103: Phase 103: Phase of searching for communicating objects for a given period
104: Phase 104: Utilization of the identifiers in accordance with the application
105: Phase 105: Connection and collection of the identifiers
106: Phase 106: Connection and transfer of the identifier
107: Phase 107: Sleep phase for a given period
108: Phase 108: Sleep phase for a random period
109: Phase 109: Call mode for 21 ms
110: Phase 110: Call mode?
111: Phase 111: Initialization of the system
112: Communicating object reader
113: Communicating object Description of the algorithm of FIG. 2.

From the point of view of the reader, the latter, once the program is activated, switches into communication mode and periodically searches for communicating objects. If it finds a communicating object, it establishes a communication and receives the identifier of the communicating object. Once the identifier or identifiers are received from the various communicating objects, it uses them in accordance with the application.

From the point of view of the communicating object, the latter periodically searches for readers. If it detects one, it sends it its identifier (page mode) after a random sleep period that makes it possible to avoid collisions between the communications of the various identifiers. It then returns to a sleep phase for a given time, until the next wakeup and search for a reader.

Figure 3:
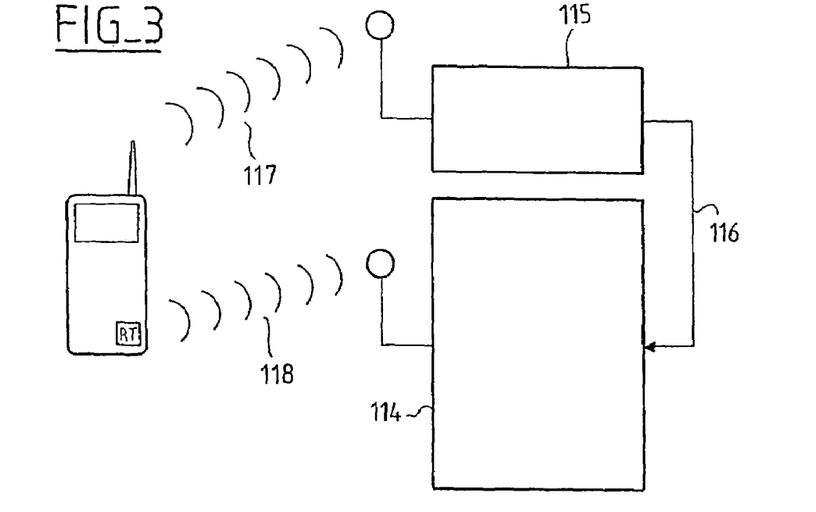
FIG. 3 schematically represents the activation of the Bluetooth communication system through the detection of GSM signals in accordance with an embodiment of the present invention.

We will now describe FIG. 2, which schematically represents the activation of the Bluetooth communication system through the detection of GSM signals.

The numerical references below designate the following technical elements:

114: Bluetooth equipment
115: Signal detector
116: Wakeup signal
117: GSM signal
118: Bluetooth signal The Bluetooth communication function is activated through the detection of a GSM field signal of a certain amplitude. If this signal is detected, then the function is activated; otherwise, the system continues its search.

Figure 4:
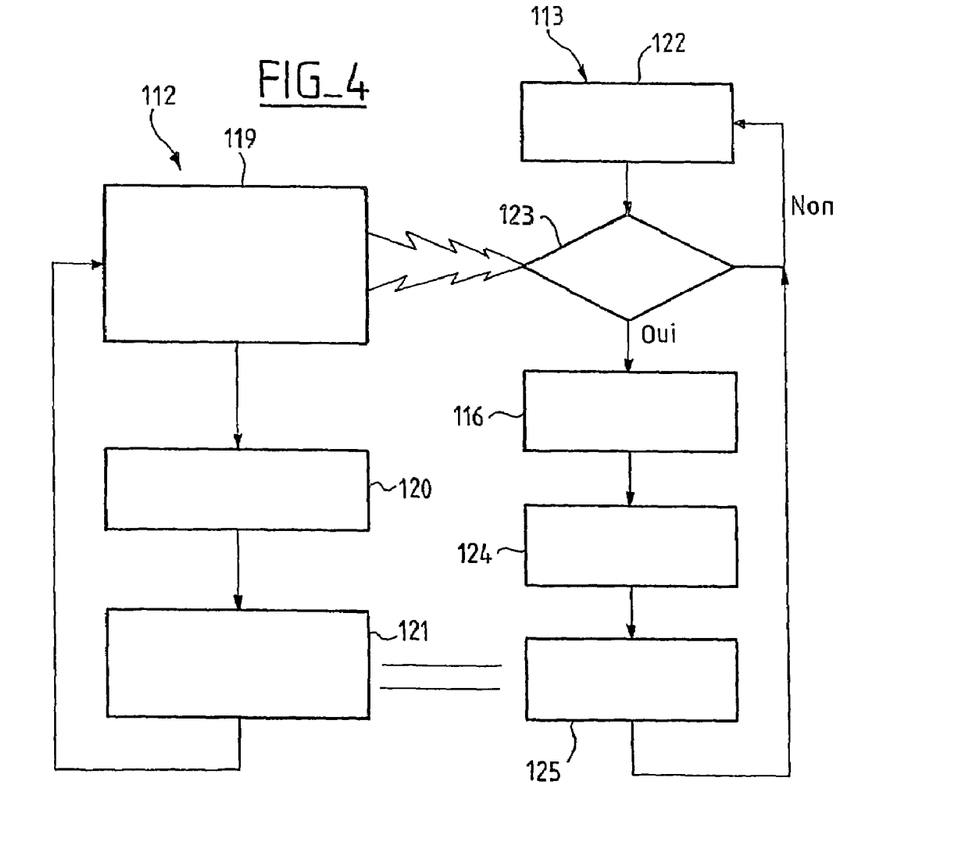
FIG. 4 represents the operational algorithm of the activation system of FIG. 3 in accordance with an embodiment of the present invention.

We will now describe FIG. 4, which represents the operational algorithm of the activation system of FIG. 3.

The numerical references below designate the following technical elements:

112: Communicating object reader
113: Communicating object
119: Phase 119: The user activates the GSM system in the portable reader
120: Phase 120: Resumption of Bluetooth activity
121: Phase 121: Reception of the identifier of the communicating object
122: Phase 122: Listening for a signal
123: Phase 123: Is the signal above a given limit?
116: Wakeup signal for the Bluetooth part
124: Phase 24 for starting the Bluetooth activity
125: Phase 125 for transferring the identifiers of the communicating objects The communicating object only activates the Bluetooth communication mode if the communicating object detects a GSM signal of a certain given amplitude. If this signal is detected, then the Bluetooth activity is started, and if a communicating object reader is present, then the communicating object transfers its identifier to it.

Figure 5:
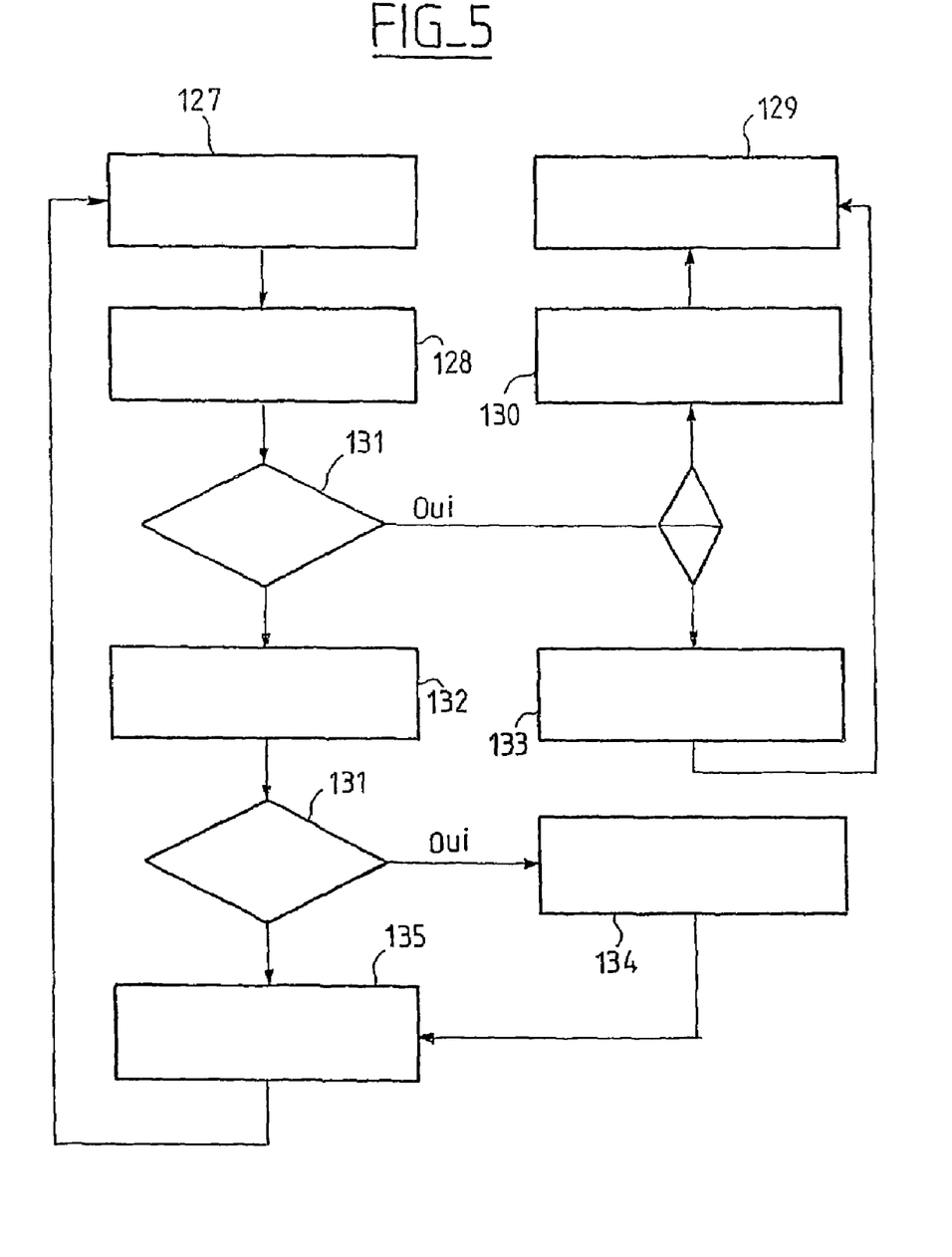
FIG. 5 represents the behavior of a communicating object in individual mode in accordance with an embodiment of the present invention.

We will now describe FIG. 5, which represents the behavior of a communicating object in individual mode.

The numerical references below designate the following technical elements:

127: Phase 127: Wakeup of the system
128: Phase 128: The sending and listening by a communicating object (inquiry mode or Bluetooth call) for the master of the community OR for other chips in individual mode.
129: Phase 129: Enters into community mode
130: Phase 130: Joins the community if it receives a response from the master of the community
131: Phase 130: Is there a response?
132: Phase 132: Search for a communicating object reader
133: Phase 133: Creation of a new community if there is a response from an individual
134: Phase 134: Sending the identifier of the chip
131: Phase 131: Is there a response?
135: Phase 135: Sleep phase for a given period When a communicating object is alone, it seeks to enter into communication with a community of communicating objects or with other communicating objects seeking to form a community. If the communicating object receives a response from a communicating object having the status of master of a community, then it joins the community. If the communicating object finds other communicating objects in individual mode, then they form a community.

In the case where the communicating object does not find either of these two types of elements, it then searches for a communicating object reader. If it finds one, then it communicates its identifier to it; if not, it returns to a sleep phase until the next cycle of these three elements.

Figure 6:
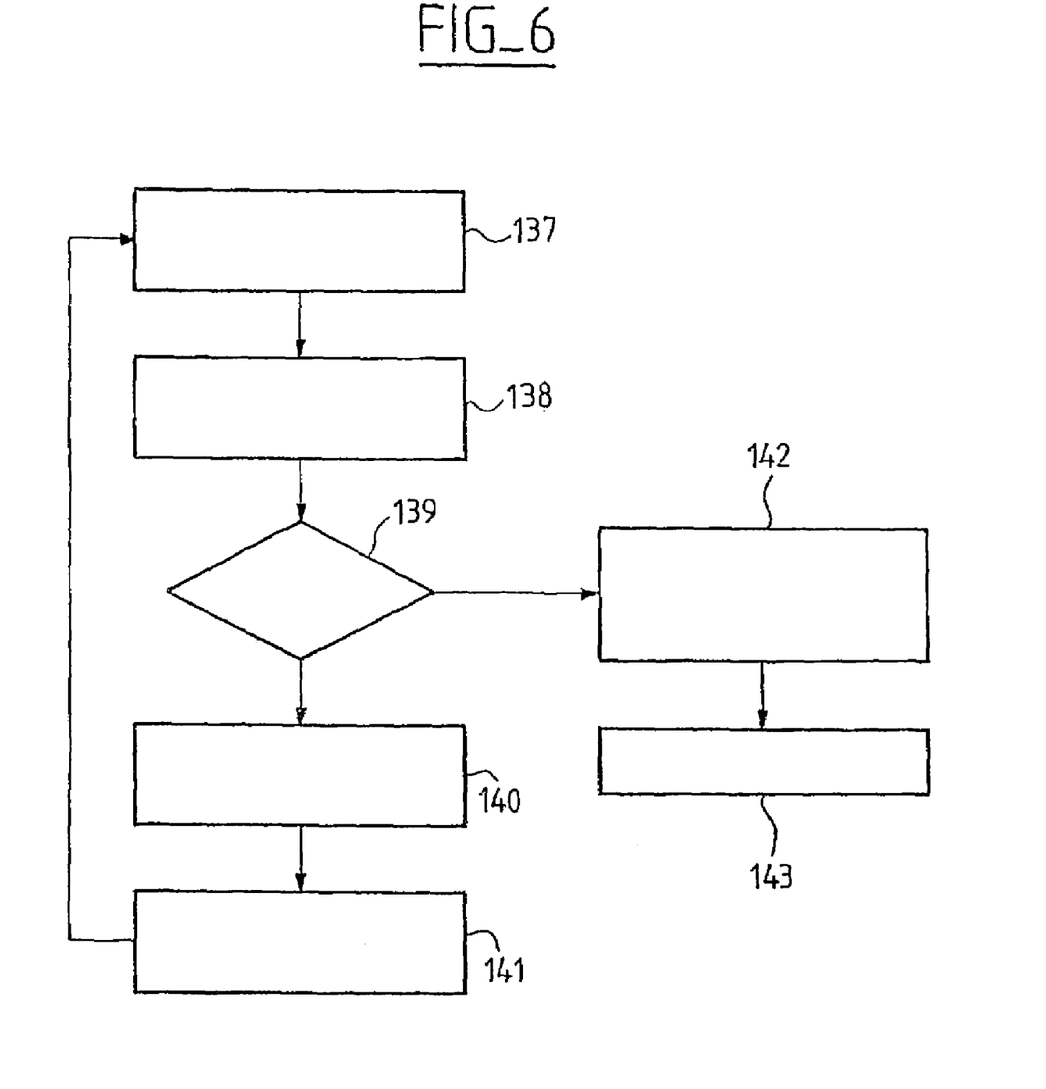
FIG. 6 represents the behavior of a slave communicating object in community mode in accordance with an embodiment of the present invention.

We will now describe FIG. 6, which represents the behavior of a slave communicating object in community mode.

The numerical references below designate the following technical elements:

137: Phase 137: Wakeup time imposed by the current master
138: Phase 138: Listening for a communication from the new master
139: Phase 139: Communication?
140: Phase 140: Transmits the identifier of the chip to the new master and obtains the wakeup time
141: Phase 141: Entry into deep sleep mode
142: Phase 142: Either a chip has been removed from the community of chips or a new master has been removed.
143: Phase 143: Entry into individual mode When a communicating object is one of the members of a community with a master communicating object, it behaves as follows:

The master imposes the wakeup time. Once woken up, the slave object searches for a signal from the master. If this communication has taken place, then the slave object transmits its identifier and obtains the new wakeup time, then goes into sleep mode.

If this communication has not been established, either the master object has been removed or this slave object has been removed from the community. The slave then goes into individual mode.

Figure 7:
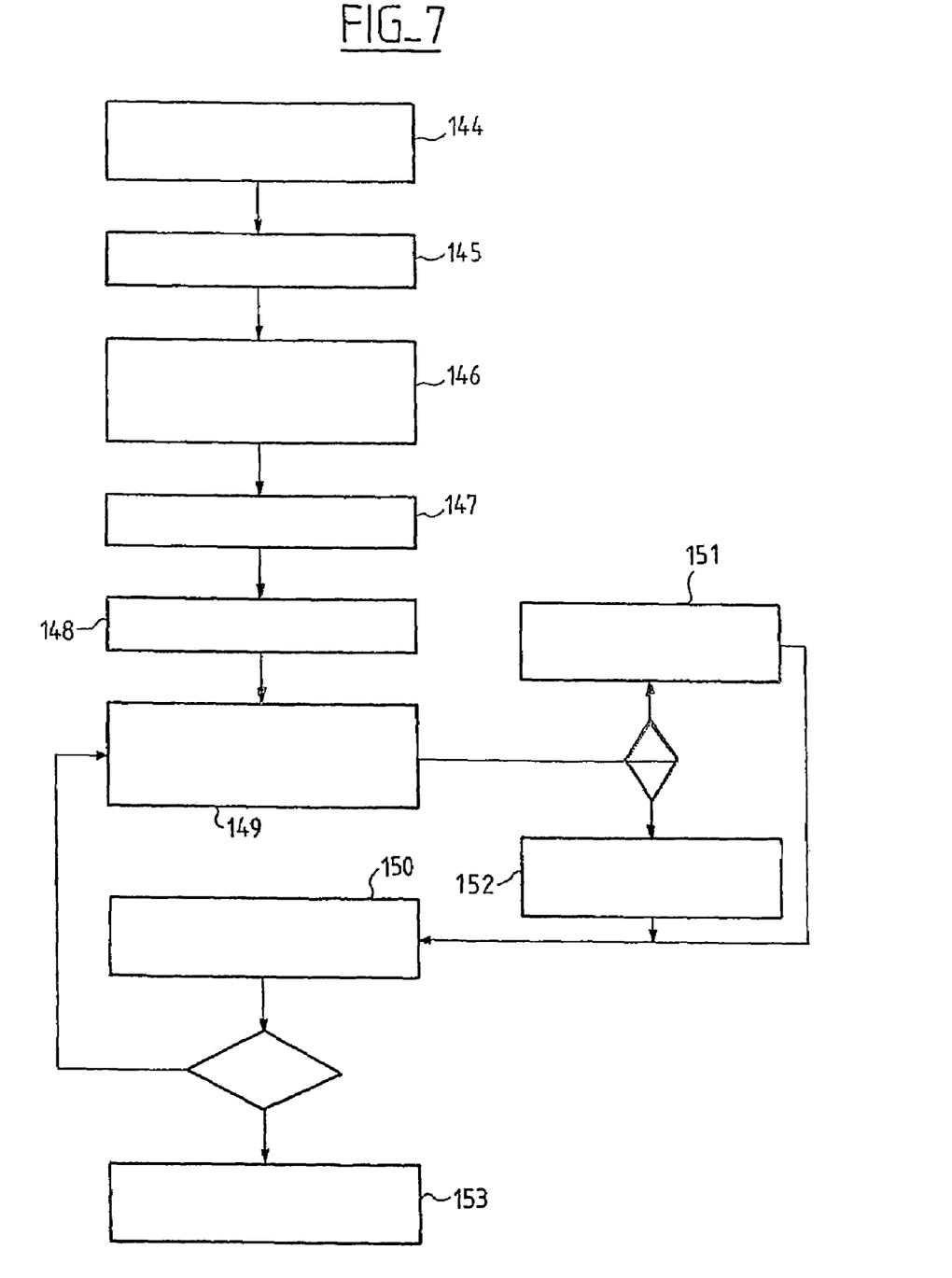
FIG. 7 represents the operation of a master communicating object in community mode in accordance with an embodiment of the present invention.

We will now describe FIG. 7, which represents the operation of a master communicating object in community mode.

The numerical references below designate the following technical elements:

144: Phase 144: A chip is designated as the master by the previous master, and the old master becomes a slave.
145: Phase 145: Community mode—Master
146: Phase 146: The chip performs an inquiry process to verify which chips belong to the community. All of the identifiers are recorded.
147: Phase 147: The master chip gives all the chips the wakeup interval.
148: Phase 148: The chip designates a chip to become the master.
149: Phase 149: The chip searches for a reader and for chips seeking to join the community.
150: Phase 150: The chip transmits the updated list to the members of the community at defined intervals.
151: Phase 151: If a reader is found, all the identifiers of the community are transferred.
152: Phase 152: If a new chip is found, the wakeup information is transmitted. Its identifier is added to the list.

153: Phase 153: After a defined time, the role of master is transferred to the next master.

A communicating object is designated as the master by the previous master. The master performs a process for verifying the identifiers transmitted by the previous master. All of the identifiers are stored.

The master then gives all the slaves their wakeup time, and it designates the new master of the community.

The master searches for a communicating object reader to which to transmit the identifiers or for a communicating object to be joined to the community.

If a reader is found, all of the stored identifiers are transmitted. In the case where the master finds a communicating object, its identifier is added to the list and the wakeup time is communicated to it.

At the end of the cycle, the new master assumes its role and the old one goes back to being a slave.

The solution according to the invention makes it possible to open up access to a wide range of innovative applications, while making Bluetooth functionalities accessible from a communicating object.

Making Bluetooth work in a very low power consumption mode opens up the possibility of using it from a communicating object, thus making objects "intelligent." However, the acceleration of the connection time is a principle that can be applied to systems that are powered (i.e., have a main power source) but that need extremely fast access to information.

A constantly growing volume of data is stored in networks, and the problem lies in accessing it. The purpose of the technology according to the invention is to establish, through its interface, a direct connection between the physical world and the users via their standard communication device equipped with a Bluetooth connection. Thus, the invention allows immediate access to the information associated with a given object.

In its consumer application, the technological solution according to the invention makes it possible to provide many value-added services via portable telephones and other standard communication devices (PDAs, etc.) For example, a user can immediately obtain information associated with a billboard, a poster for a show, or a painting exhibited in a museum by clicking directly at these objects using a mobile telephone device. He can thus access the most relevant information with one click.

Fabien Beckers' French patent application No. 01/06883, filed on May 25, 2001, describes how it is possible to "surf" in a city, just like an internaut explores a website.

The technology according to the invention makes it possible to link the profusion of data to the need to disseminate knowledge intelligently in response to real needs. The technology according to the invention makes it possible to respond to the growing problem of quick access to relevant information, making it possible to move from a world of data to a world of information and knowledge.

The invention claimed is:

1. A method for rapidly establishing a communication between at least one reader having a communication protocol and a plurality of communicating objects, each communicating object having a communication protocol and a communication address, the method comprising the steps of:
   defining a unique communication address for all of the communicating objects;
   determining whether at least one communicating object is present in the environment in which said reader is located by sending a request to the unique communication address of all the communicating objects by said reader; and
   sending a response signal that is time-shifted relative to response signals sent by other communicating objects by each communicating object that receives said request to reveal its presence to said reader, said response signal having a piece information specific to said communicating object, thereby reducing the time required to determine whether at least one communicating object is present.

2. The method of claim 1, wherein said reader is associated with a mobile telephone unit and further comprising the steps of:
   detecting GSM signals sent by said mobile telephone unit by said communicating object; and
   activating and sending said response signal to said request based on the detected GSM signals by said communicating object, thereby reducing the power consumption of said communicating object by activating the sending of said response signal only at the appropriate time.

3. The method of claim 1, wherein said communication protocol comprises standby phases and active phases; and further comprising the step of adapting the duration of said standby phases to a number of said requests sent by said reader.

4. The method of claim 1, further comprising the step of establishing a Bluetooth type connection between said reader and said communicating object using said piece of specific information received from said communicating object.

5. The method of claim 1, further comprising the steps of:
   giving one of said communicating objects a status of a master communicating object relative to the other communicating objects having status of slave communicating objects;
   collecting the communication address and/or said specific information from said slave communicating objects by said master communicating object;
   responding to said requests sent by said reader by said master communicating object so that said reader collects all of the information from said plurality of communicating objects.

6. The method of claim 5, further comprising the step of transferring to another communicating object the status of a master communicating object by said master communicating object.

7. The method of claim 6, further comprising the steps of:
   communicating to the new master communicating object the information concerning the other communicating objects by the previous master communicating object; and
   verifying the information from the previous master communicating object by said new master communicating object.

8. The method of claim 1 being activated by means of an application linked to said communicating object when said application is activated by a user of said communicating object.

9. A system for rapidly establishing a communication between at least one reader and a plurality of communicating objects, comprising
   a plurality of communicating objects, each communicating object comprising a same communication address and a communication protocol; and
   a reader comprising a communication protocol and a first sending means for sending a request to said communication address unique to said plurality of communicating objects; and
   wherein each of said communicating object that receives said request comprises a second sending means for sending a response signal that is time-shifted relative to response signals sent by other communicating objects to reveal its presence to said reader and a data processor for inserting a piece of information specific to said communication object in said response signal, thereby allowing said reader to rapidly determine whether at least one communicating object is present in the environment in which said reader is located.

10. The system of claim of claim 9, wherein said reader is associated with a mobile telephone unit; and wherein each communicating object further comprises a detection means for detecting GSM signals sent by said mobile telephone unit and an activation means for activating the sending of said response signal to said request by said second sending means based on the detected GSM signals, thereby reducing the power consumption of said communicating object by activating the sending of said response signal only at the appropriate time.

11. The system of claim 9, wherein said communication protocol comprises standby phases and active phases; and wherein said data processor of said communicating object is operable to adapt the duration of the standby phases to the number of requests sent by said reader.

12. The system of claim 9, further comprising a connection means for establishing a Bluetooth type connection between said reader and said communicating object using said piece of specific information received from said communicating object.

13. The system of claim 9, wherein one of said plurality of communicating objects is given a status of a master communicating object relative to the other communicating objects having a status of slave communicating objects; and wherein said data processor of said master communicating object is operable to:
    collect the communication address and/or said specific information from each slave communicating object; and
    respond to said requests sent by said reader so that said reader collects all of the information from said plurality of communicating objects.

14. The system of claim 13, wherein said data processor of said master communicating object is operable to transfer to another communicating object the status of master communicating object.

15. The system of claim 14, wherein said data processor of the previous master communicating object is operable to communicate to the new master communicating object the information concerning the other communicating objects; and wherein said data processor of the new master communicating object is operable to verify the information from the previous master communicating object.

16. The system of claim 9, wherein said communicating object is linked to an application module which is operable to trigger the establishment of the communication between said communicating object and said reader, and wherein said application module being activated by a simple action from a user of said communicating object.

17. A communicating object for rapidly establish a communication with a reader having a communication protocol, said communicating object having a communication protocol and a communication address which is same as the communication address for all other communication objects, and wherein said reader comprises a first sending means for sending a request to the communication address, said communicating object comprising:

a receiving means for receiving said request from said reader;
a data processor for inserting a piece of information specific to said communication object into a response signal to said request; and
a second sending means for sending said response signal that is time-shifted relative to response signals sent by the other communicating objects so that each communicating object reveals its presence, thereby allowing said reader to rapidly determine whether at least one communicating object is present in the environment in which said reader is located.

18. The communicating object of claim 17, wherein said reader is associated with a mobile telephone unit; and further comprising:
    a detection means for detecting GSM signals sent by said mobile telephone unit; and
    an activation means for activating the sending of said response signal to said request by said second sending means based on the detected GSM signals, thereby reducing the power consumption of said communicating object by activating the sending of said response signal only at the appropriate time.

19. The communicating object of claim 17, wherein said communication protocol comprises standby phases and active phases; and wherein said data processor of said communicating object is operable to adapt the duration of the standby phases to a number of said requests sent by said reader.

20. The communicating object of claim 17, further comprising a connection means for establishing a Bluetooth type connection between said reader and said communicating object using said piece of specific information received from said communicating object.

21. The communicating object of claim 17, wherein said data processor is operable to:
    give said communicating object a status of a master communicating object relative to the other communicating objects having a status of slave communicating objects;
    collect the communication address and/or said specific information from each slave communicating object; and
    respond to said requests sent by said reader so that said reader collects all of the information from said plurality of communicating objects.

22. The communicating object of claim 21, wherein said data processor of said master communicating object is operable to transfer to another communicating object the status of master communicating object.

23. The communicating object of claim 22, wherein said data processor of said master communicating object is operable to communicate to the new master communicating object the information concerning the other communicating objects; and wherein said data processor of the new master communicating object is operable to verify the information from said master communicating object.

24. The communicating object of claim 17, wherein said communicating object is linked to an application module which is operable to trigger the establishment of the communication between said communicating object and said reader, and wherein said application module being activated by a simple action from a user of said communicating object.

* * * * *